UNITED STATES PATENT OFFICE.

ALEXANDER SCHWARCMAN, OF BUFFALO, NEW YORK, ASSIGNOR TO SPENCER KELLOGG & SONS, INC., OF BUFFALO, NEW YORK, A CORPORATION OF NEW YORK.

MANUFACTURE OF VARNISH OILS.

1,407,952.  Specification of Letters Patent.  Patented Feb. 28, 1922.

No Drawing.  Application filed March 17, 1921. Serial No. 453,037.

*To all whom it may concern:*

Be it known that I, ALEXANDER SCHWARCMAN, a citizen of the United States, residing at Buffalo, in the county of Erie and State of New York, have invented certain new and useful Improvements in the Manufacture of Varnish Oils, of which the following is a specification.

This invention relates to the manufacture of varnish oils; and it comprises a method of making linseed oil capable of being heated to any temperature without "break," wherein raw hot linseed oil is given a slight addition of a linoleate of a non-catalytic metal, such as the zinc salt, the aluminum salt or the calcium salt; and it also comprises as a new composition of matter, an improved varnish oil having the normal acidity and other general properties of raw linseed oil, but distinguished therefrom by not forming a precipitate or break when heated to a high temperature and by containing slightly more of a basic non-catalytic oxid than is normally present in the ash of the raw oil; all as more fully hereinafter set forth and as claimed.

For very many varnish and other purposes it is desirable to have a varnish oil which shall have the ordinary properties of raw linseed oil, including its acidity, but which shall differ therefrom by not exhibiting a "break" when heated to high temperatures. It is an object of the present invention to provide a simple and economical method of making such an oil.

Raw linseed oil is somewhat acid and contains a number of impurities in solution or pseudo-solution (suspension) derived from the linseed, such as gums, albuminoids, etc., which on heating flocculate or coagulate, or both, as a coarse grained suspension, giving what is known as a "break." This tendency to "break" being undesirable, it is usual to purify the raw oil with caustic soda lye. Soda-treated oil however while no longer exhibiting the undesirable break loses a number of other properties for which raw linseed oil is valued. The alkali of course neutralizes the acidity; and a certain degree of acidity is desirable in a varnish oil.

In another and prior Patent, 1,291,186, dated January 14, 1919, I have described the manufacture of a drying oil wherein raw linseed oil is heated with linoleates of various "drying" oxids; that is, oxids which act catalytically to promote oxidation of the oil by the air. It is customary to treat linseed oil with driers in making "boiled oil" in order to accelerate drying when the oil is used as a varnish or paint vehicle; and in the stated patent I devised an improvement on this treatment wherein there was used a linoleate of a catalytic metal, such as manganese or lead. In making this drier, separated fatty acids from linseed oil were heated, a salt of the desired metal added thereto, and a little alkali used to precipitate the metal oxid from the salt and cause it to combine with the fatty acids. A drier so made when added to the oil gives a "boiled oil" drying very quickly; drying in as many hours as the raw oil would take days.

I have found that if I use similar compounds of a non-catalytic metal, such as zinc, calcium or aluminum, and add these compounds to acid raw oil at a rather high temperature, incorporating them thoroughly, the raw oil, thereafter will preserve its normal properties and particularly its acidity, but will be freed of the undesirable break. As to the reason why very small quantities of linoleates of the non-catalytic metals have this effect I cannot say and content myself with noting the fact. The amount required is very small; and except for the fact of the presence of this slight amount of added material in the ash of the oil and of the absence of a break on heating, the material is otherwise indistinguishable from raw oil. It has all the valuable properties of raw oil. Its period of drying is about the same as that of the raw oil; the present treatment making no difference in that respect.

Linoleates of non-catalytic metals suitable for the present purposes may be made in various ways. They may be made as precipitated soaps by treating a solution of a soda soap made from linseed oil with the appropriate chlorid; calcium chlorid, zinc chlorid, etc. Insoluble soaps are precipitated, and these may be washed, dried and incorporated into the raw oil. With these precipitated soaps, however, because of their slow solution in the oil, an incorporation temperature as high as 400° F. is sometimes necessary in order to achieve good incorporation. Very thorough agitation is also required. A better way of making the soaps of non-catalytic metals suitable for the present purposes is analogous to, but not quite the same as, the method described in the acknowledged patent. In so doing, in making the lime soap, the fatty acids of linseed oil may be made in any suitable way, as by the well known Twitchell method. The oily acids are heated to, say, 250° F. and 4 or 5 per cent of fine dry lime is sprinkled into the liquid and incorporated therewith. This gives a small amount of lime soap dissolved in an excess of acid. The zinc preparation is made in the same way substituting zinc oxid or carbonate for lime. An aluminum preparation can be made in the same way by using a precipitated alumina preparation not dried at a high temperature; but when an aluminum compound is wanted it is better to proceed in a manner analogous to that of my acknowledged Patent 1,291,186: the hot fatty acids at 240° to 250° F. being treated with a solution of aluminum chlorid or aluminum sulfate in water, the addition being followed with that of enough caustic soda solution to combine with the hydrochloric or sulfuric acid of the aluminum compound used. This gives a precipitation of alumina in the presence of the fatty acids and it dissolves readily.

In making the improved varnish oil of the present invention, it suffices to add about 1 or 2 per cent of material made as above indicated to cold raw linseed oil, stirring it in and then heating to about 240° F. After this is done, no further treatment of the linseed oil is necessary.

In the procedure just described it will be noted that fatty acids are mixed with 4 or 5 per cent of a basic oxid; an amount insufficient to neutralize such fatty acids. The result is a preparation containing a little of the corresponding soap dissolved in an excess of fatty acid. Assuming that 5 per cent of lime on the weight of the fatty acid is used and that 1.5 per cent of this preparation has been added to cold linseed oil, it will be obvious that the latter contains only about 0.075 per cent of lime; an almost infinitesimal quantity. In practice, as a matter of fact, I prefer to use even less, say, about 0.05 per cent. Nevertheless, this small amount of lime, so incorporated, prevents the oil displaying a break on heating.

From a practical point of view, it will be seen that my process of obviating the break in raw linseed oil consists in merely stirring into the heated raw linseed oil a microscopic amount of certain particular linoleates. No expensive apparatus or operation is required; the fatty acids carrying the dissolved soaps are simply added in the barrel or the tank and stirred in.

I find that in practice the three oxids named give the best results and of the three I find that lime is, on the whole, the best, if only for the reason that the fatty acid preparation containing it is somewhat easier to make than the corresponding zinc or alumina preparations.

In adding the preparation for treating raw linseed oil made as described, the acidity is of course increased concomitantly; but because of the very small amount of the preparation which is needed, the increase is almost inappreciable; it does not change the properties of the treated oil, as regards acidity, to any substantial degree.

My improved varnish oil is characterized by the fact that, while it has most of the analytical constants and the properties of raw linseed oil, the acidity is very slightly in excess and the oil, upon burning to an ash, shows the presence of a little added base. The ash in linseed oil is very small in any event, and although the added base has a very small proportion to the oil, it adds appreciably to the amount of base in the ash. In the event that zinc oxid is used as the base, naturally, the treated oil gives an ash containing zinc. On burning a zinc oxid treated oil down to an ash, an ash is obtained which is yellow while hot.

What I claim is:—

1. The process of producing a non-breaking raw linseed oil which comprises incorporating in such raw linseed oil a very small amount of a linoleate of a non-catalytic metal in solution in an excess of the fatty acids of linseed oil.

2. The process of making an improved varnish oil from raw linseed oil which comprises incorporating in raw linseed oil a small proportion of calcium linoleate.

3. As a new composition of matter, an acid varnish oil having all the properties of raw linseed oil save that it does not break on heating and that its ash displays a somewhat greater quantity of base than is normal to linseed oil.

4. As a new composition of matter, an acid varnish oil having all the properties of raw linseed oil save that it does not break on heating and that its ash displays a somewhat greater quantity of lime than is normal to linseed oil.

In testimony whereof, I affix my signature.

ALEXANDER SCHWARCMAN.